United States Patent [19]

Orlandi et al.

[11] Patent Number: 5,853,023
[45] Date of Patent: Dec. 29, 1998

[54] MULTIPURPOSE SYSTEM FOR CARTRIDGE VALVES TO MIX HOT AND COLD WATER

[75] Inventors: Alessio Orlandi; Roberto Orlandi, both of Castiglione Delle Stiviere, Italy

[73] Assignee: Galatron SRL, Castiglione Delle Stiviere, Italy

[21] Appl. No.: 738,483

[22] Filed: Oct. 28, 1996

[30] Foreign Application Priority Data

Nov. 3, 1995 [IT] Italy .................................. UD95A0218

[51] Int. Cl.⁶ ................................................. F16K 11/074
[52] U.S. Cl. .................. 137/271; 137/625.17; 137/625.4
[58] Field of Search ................................. 137/269, 271, 137/270, 625.17, 625.4, 625.41

[56] References Cited

U.S. PATENT DOCUMENTS

| | | |
|---|---|---|
| 4,942,902 | 7/1990 | Knapp . |
| 5,355,906 | 10/1994 | Marty et al. . |
| 5,402,819 | 4/1995 | Bosio ....................................... 137/270 |
| 5,402,827 | 4/1995 | Gonzalez . |

FOREIGN PATENT DOCUMENTS

| | | |
|---|---|---|
| 555615 | 8/1993 | European Pat. Off. . |
| 571768 | 12/1993 | European Pat. Off. . |
| 2570792 | 3/1986 | France . |
| 3211619 | 10/1983 | Germany . |
| 8520276 | 9/1985 | Germany . |

*Primary Examiner*—Kevin Lee
*Attorney, Agent, or Firm*—Stevens, Davis, Miller & Mosher, L.L.P.

[57] ABSTRACT

Multipurpose system for cartridge valves to mix hot and cold water which comprises a cartridge body (20) and a plurality of auxiliary elements such as adapters and elements having specialist functions, the cartridge body (20) being completed with a closure element (22), which includes in its outer surface at least one connecting hollow (34) extending circumferentially, at least one auxiliary element including a portion mating with the connecting hollow (34)

24 Claims, 7 Drawing Sheets

MULTIPURPOSE SYSTEM FOR CARTRIDGE VALVES TO MIX HOT AND COLD WATER

This invention concerns a multipurpose system for mixing valves to mix hot and cold water for sanitary apparatuses, as set forth in the main claim.

To be more exact, the invention concerns an integrated system able to widen the suitability for application and the versatility of the cartridge-type mixing valves of a type standardised dimensionally.

These cartridge mixing valves are inserted into a suitable cavity in a tap body, the cavity being located in an intermediate position between the pipes delivering the hot and cold water and an outlet for delivering the mixed water towards the sanitary apparatus.

The cartridge mixing valves of a basic type disclosed in the state of the art include a substantially cylindrical cartridge body which encloses the functional elements intended to control the delivery and closure of the two types of water to be mixed and delivered, this cartridge body being equipped with means for its correct positioning in the tap body.

At the present time, to the basic configuration of two or three sizes having a standardised outer diameter and length there are added as many more different contrivances as there are different requirements and conditions of application of the valves for working.

In actual fact, mixing valves can be found with a bottom including merely two basic feet which, being inserted in corresponding holes in the bottom of the cavity of the tap body in which the valve is to be located, enable the valve to be correctly positioned and oriented.

The sizes and distance between centres of the feet may vary between one producer of valves and another, and therefore it is possible that the valves of one supplier cannot be interchanged with the valves of another supplier.

Next, mixing valves are available with a bottom having an adapter block, and mixing valves are also available with a so-called bottom distributor, both these valves being used under particular conditions.

Moreover, the mixing valves with these special features require feet for their positioning in the tap body.

The mixing valves can also be combined with other means such as a pressure-balancing means, non-return valves, etc., and in this case too the valves have to be pre-arranged for a suitable combination.

In other words, at the present time it is necessary to have ready and available mixing valves, each of which is independently suitable as regards dimensions and equipment for the use in question but substantially without the ability to be converted or adapted according to prevailing requirements.

This situation is such because a "universal" valve is lacking which would be suitable for any installation conditions.

Partial solutions to the problem have been disclosed so that, for instance, by using the outer wall of the cartridge, a terminal replaceable element has been provided which forms also a bottom wall for closing and positioning the means inside the cartridge.

This solution, besides being conditioned dimensionally (outer diameter), requires great attention and care in replacing the terminal replaceable element so as to prevent all the inner parts losing their pre-set positions applied during their assembly, this too without considering the dangers of breakage and blocking.

An independent adapter element has also been disclosed which is anchored to the completed bottom of the mixing valve, but this disclosure provides a limitation of a dimensional type and of a typological character of the cartridge and therefore does not provide any teaching which leads to an integrated standardised system suitable to meet the problems of specialisation and adaptation of the standardised sizes of mixing valves.

The present applicants have designed, tested and embodied this invention to overcome all the above shortcomings and to achieve further advantages.

This invention is set forth and characterised in the main claim, while the dependent claims describe variants of the idea of the main embodiment.

The purpose of this invention is to overcome the lack of a "universal" valve and therefore to provide for the embodiment of an integrated and versatile system suitable to meet all the requirements of adaptation and specialisation of the various standardised sizes of the cartridges of mixing valves.

The purpose of the invention is therefore to provide a mixing valve which starts "bare" but completed in itself and therefore complete with all the functional parts, including the closure bottom, and which can then be equipped from time to time with complementary elements, whether those elements be adapters or elements performing specialised functions.

This situation provides the advantage that, by providing one single size of mixing valve, it is possible to obtain a "universal" system which can be used in any tap and under any condition of a known type, thus eliminating the need to have to prepare and have available different sizes with different functions.

According to the invention there is provided a standardised size of cartridge mixing valve complete in itself and including an outer bottom surface with standardised anchorage means.

The various adapters and specialised elements which have to be applied to the bottom of the cartridge mixing valve to meet the various requirements of adaptation and/or specialised working include mating means for their combination with the outer surface of the bottom either directly or with the help of an adapter element.

Therefore the bottom wall of the cartridge body of the valve is structured for the application thereto, according to requirements, of any one of the many complementary modular elements such as positioning feet, adapter blocks, distributor elements and other means which, in turn, have been designed for coupling to the bottom wall.

It follows that it is possible to construct and have available, on the one hand, mixer valves which are all the same and, on the other hand, merely complementary elements, and that each mixing valve can be equipped, even at the moment it is set to work, with any complementary element selected by the person carrying out the installation on the basis of the prevailing requirements.

This idea of the embodiment entails a plurality of advantages.

First of all, it reduces the number of standardised sizes of the cartridges to one single size with the obvious result of savings as regards investments, better use of company resources, smaller consumption of materials and of energy, less space taken up, etc.

Moreover, it reduces stocks and therefore the finances tied up, it simplifies the completion of orders, it reduces mistakes in deliveries, it lowers the costs for the end user and reduces the problems of maintenance and replacement to be borne by the end user.

According to a variant, the invention arranges that the system employs, as a standardised size of the cartridge mixing valve, the smallest standardised size and that through suitable adapter means that size can therefore be located, even as a replacement, in positions provided for larger standardised sizes.

According to the invention the outer surface of the closure element includes standardised coupling means, which mate with the coupling means provided on the connecting surface of the auxiliary elements.

According to the invention a basic adapter element is provided which completes the cartridge body and makes it substantially the same as the present cartridge bodies and also completes the cartridge and makes it ready for use.

According to the invention, moreover, this basic adapter element is used to connect auxiliary elements of the state of the art of a standardised type and produced at the present time for coupling to cartridge bodies of a traditional type.

By means of this contrivance the system is usable both for specifically designed auxiliary elements and for auxiliary elements of a traditional and standardised type already on the market.

The attached figures are given as a non-restrictive example and show a preferred embodiment of the invention as follows.

Figure 1:
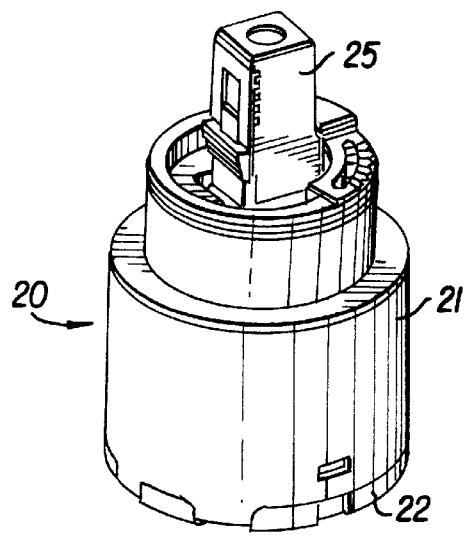
FIG. 1 shows a cartridge mixing valve complete in itself according to the invention.
Figure 2:
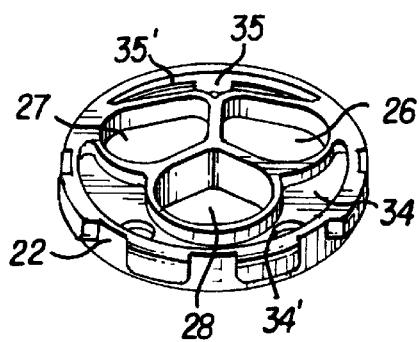
FIG. 2 shows the surface, for connection to the cartridge, of the element that closes the bottom of the cartridge of FIG. 1.

The reference number 20 in the attached figures denotes overall a cartridge body complete in itself and therefore including also a closure element 22 of a mixing valve having standardised measurements on the basis of market standards, these standardised measurements being those of the smallest cartridge.

At the present time the diameter of the smallest cartridge normally produced for the market is 35 mm., and this measurement is in the present embodiment of the invention the standardised diameter of the cartridge 20.

It is clear that according to a variant the invention can be applied also to standardised cartridges having a diameter selected from the standardised diameters on the market according to the choice of the user or producer.

The cartridge body 20 consists of a bell-shaped element 21 closed with a bottom wall or closure element 22.

Figure 11A:
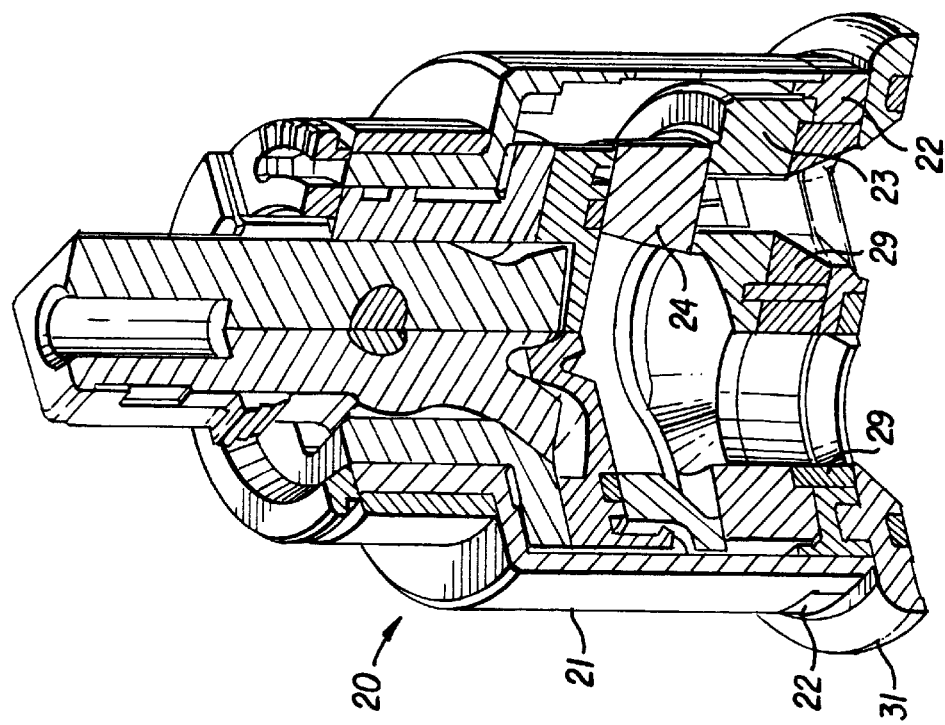
FIG. 11a is a cutaway longitudinal view of the mixing valve of FIG. 11.
Figure 11:
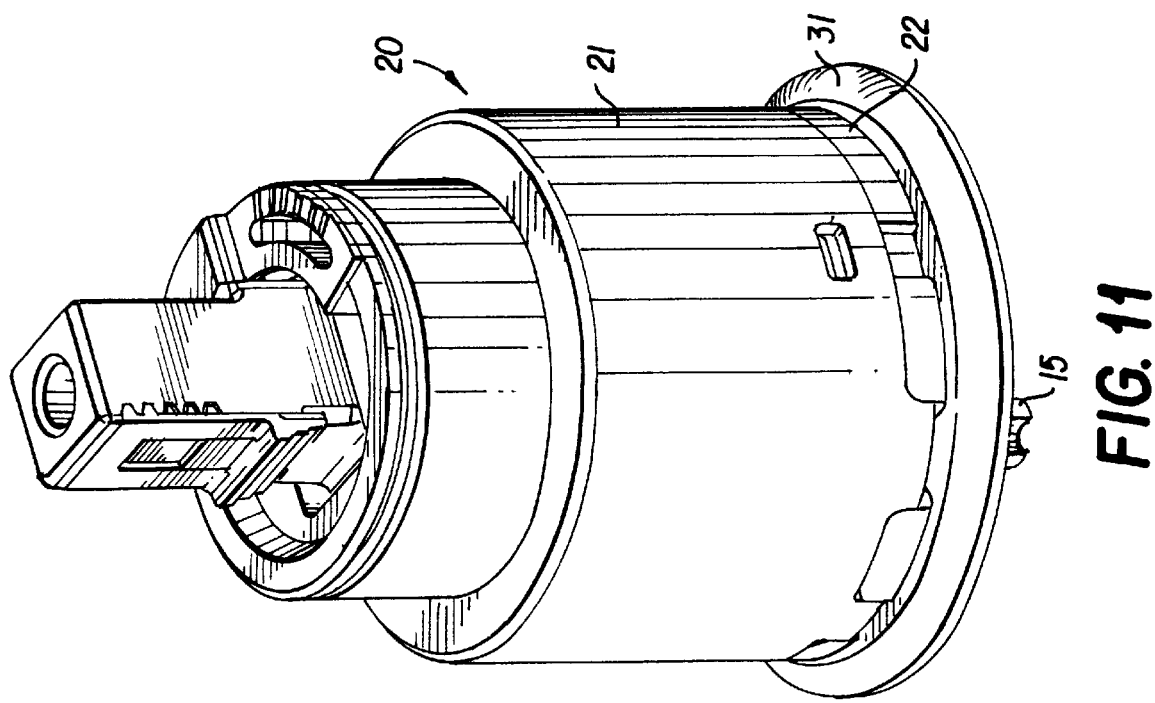
FIG. 11 is a three-dimensional view of the mixing valve of FIG. 1 completed with the adapter element of FIG. 4.
Figure 12:
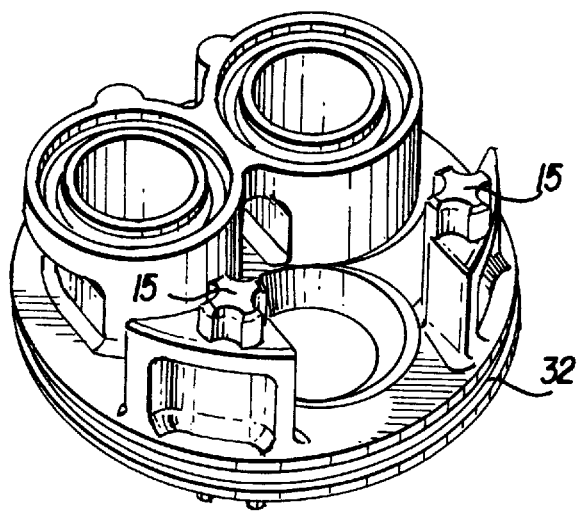
FIG. 12 shows the first distributor element of FIG. 5 in a three-dimensional view from the outside.
Figure 13:
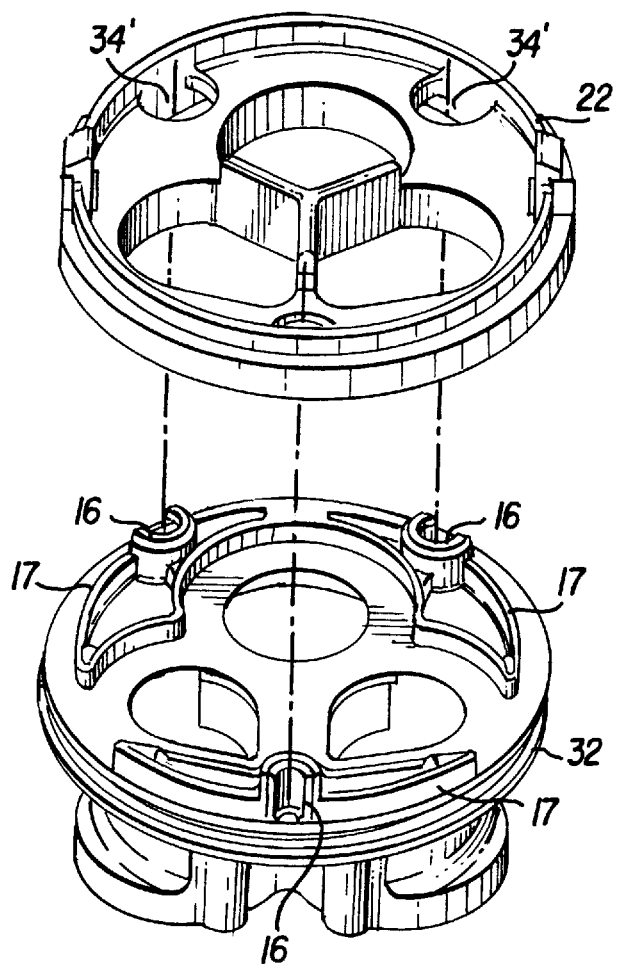
FIG. 13 is a three-dimensional view of the closure element of FIG. 2 and the first distributor element of FIG. 5 in line for coupling together.

Valve means are provided in the cartridge body 20 (FIG. 11a) and consist of two small superimposed plates 23, 24 consisting, for instance, of a ceramic material or the like, of which a lower plate 23 is stationary and an upper movable plate 24 is rested on the stationary plate 23 and is connected to and can be moved by an operating lever 25 equipped with an engagement handle, which is not shown here.

In this case, the bell-shaped element 21 and the bottom wall, or closure element 22, are connected to each other to form together the cartridge body 20 and to retain the inner working elements.

Two holes 26, 27 for the entry of hot water and cold water respectively and a hole 28 for the exit of the mixed water are included in the bottom wall 22.

The holes 26, 27, 28 for the entry and exit of the water are surrounded by or contain sealing packings 29 and are intended to communicate with pipes delivering the hot and cold water and with an outlet for delivery of the water for use.

It should be noted that in the state of the art the various sizes or measurements of the standardised cartridges 20 have a different closure element 22 with seatings for the bottom sealing packings 29 having different conformations and contacting each other.

According to this invention the outer surface of the closure element 22 including the organised seat or seats of the sealing packings 29 is so structured as to be easily coupled and disconnected to or from any of the complementary elements which are used to achieve the necessary adaptations or, or also, so as to allow the mixing valve to perform also specialised tasks.

Figure 14:
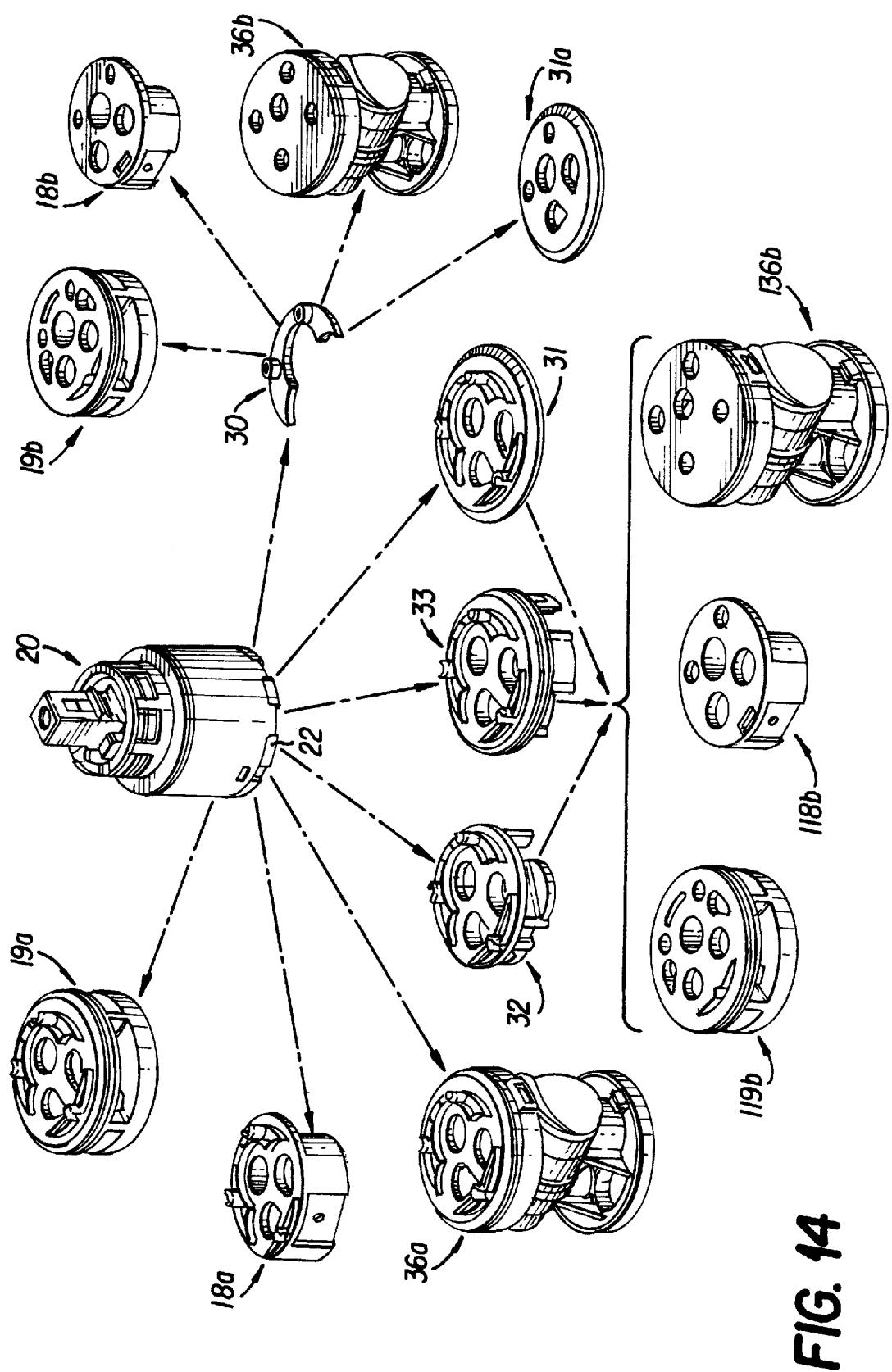
FIG. 14 shows a working diagram of the system according to the invention.

An example of the possible composition of the system which can be achieved with the invention is shown in FIG. 14.

This FIG. 14 shows some elements according to the invention such as a pressure regulator 36a, a vacuum breaker 18a and a back-to-back means 19a, which can be coupled directly to the closure element 22, and shows also the same elements 36b, 18b and 19b (and 136b, 118b and 119b of a larger size) as normally available on the market and having a standardised conformation.

These elements 36b, 18b and 19b, 136b, 118b and 119b and other analogous elements having different specialised functions can be coupled. owing to the adapters 30, 31 provided by this invention, to the cartridge body 20 so as to form the multipurpose system according to the invention.

The auxiliary elements which can be applied as desired are at least a basic adapter element 30, an adapter element 31 of greater size, a first distributor element 32, a second distributor element 33, the back-to-back means 19, a pressure regulator 36, a vacuum breaker 18, a thermostat regulator (not shown), etc.

The closure element 22 in the embodiment shown as an example includes on its outer surface a connecting hollow 34 which may, or may not, include at least a reference recess 34'.

This connecting hollow 34 extends circumferentially on the closure element 22 in a manner sufficient to create a stable connection in relation to all the axes passing through the plane of its positioning.

According to an equivalent variant, instead of one single connecting hollow 34 there may be included two or even more connecting hollows arranged in a manner coordinated with the position which the attachment feet have to take up.

According to the invention a positioner hollow 35 with a possible reference recess 35' may also be included.

The connecting hollow 34 and possibly also the positioner hollow 35 receive either the basic adapter 30 or the coordinated connecting means included in the coupling surface of the auxiliary elements already provided, such as the elements 36a, 18a, 19a, etc.

The basic adapter element 30 completes the cartridge body 20 and conforms it like a normal mixing valve ready for use since it provides below the cartridge body 20 the attachment feet 15 required for the correct positioning of the cartridge body 20 within a tap.

As we said above, the basic adapter element 30 has the purpose also of connecting auxiliary elements of the state of the art, which are of a standardised type and are therefore not purposely conformed.

The basic adapter element 30 with the attachment feet 15 is in the form of a plate dimensioned so that it can be inserted in a mating manner in the connecting hollow 34 and can be contained therein substantially at the level of the lower edge of the closure element 22 of the cartridge body 20, except for the attachment feet 15, which protrude downwards.

Figure 8:
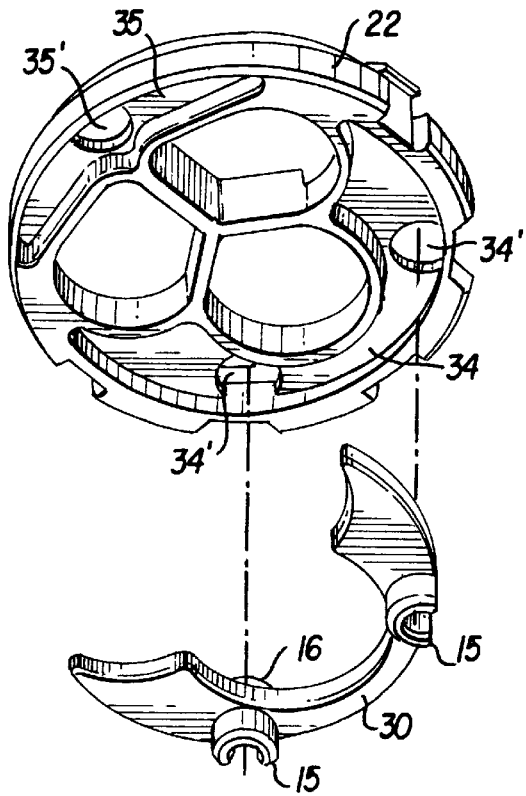
FIG. 8 shows a three-dimensional view of the bottom wall and the basic adapter element in line with each other for coupling.
Figure 8A:
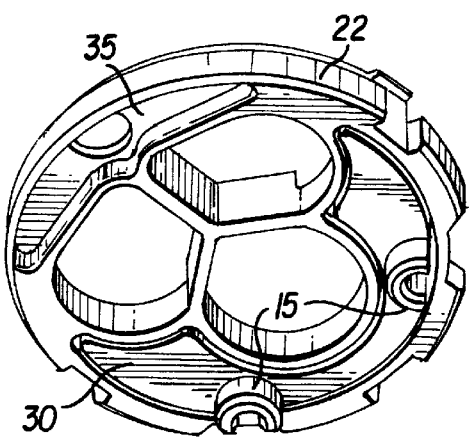
FIG. 8a is a three-dimensional view of the bottom wall and the basic adapter element when coupled.

The basic adapter element 30 can include on its upper side coupling pins 16, which are engaged in the possible reference recesses 34' of the connecting hollow 34 (see FIGS. 8 and 8a).

The basic adapter element 30 is thus constrained in the closure element 22 of the cartridge body 20 in relation to all the axes passing through the plane of positioning and enables the cartridge body 20 to be equipped on its lower side with two positioning attachment feet 15 for its emplacement at work in a tap body.

It should be noted that the sizes of the attachment feet 15 and the distance between their centres can be selected as desired, thus enabling the mixing valve to be employed under all conditions.

Figure 4:
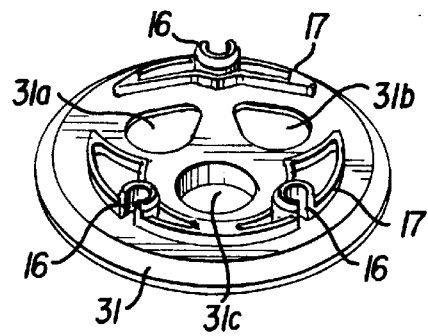
FIG. 4 shows the surface, for connection to the cartridge of FIG. 1, of the adapter element.
Figure 3:
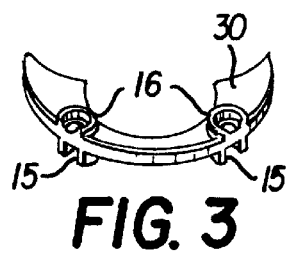
FIG. 3 shows the basic adapter element which can be applied to the outer surface of the mixing valve of FIG. 1.
Figure 5:
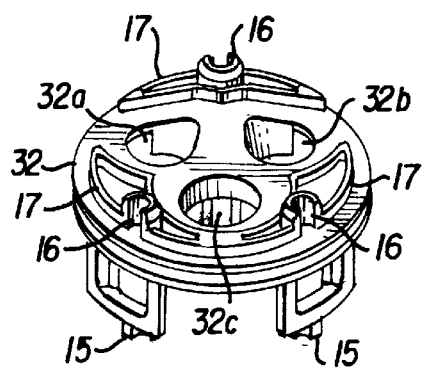
FIG. 5 shows the surface, for connection to the cartridge of FIG. 1, of a first distributor element.
Figure 6:
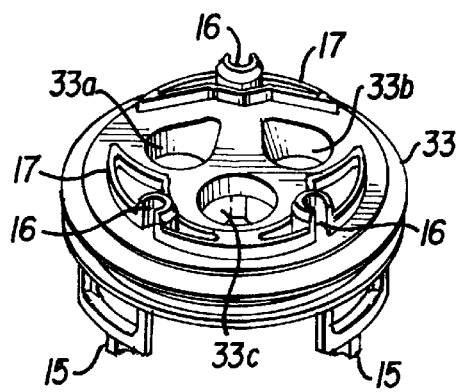
FIG. 6 shows the surface, for connection to the cartridge of FIG. 1 of a second distributor of a greater type.
Figure 7:
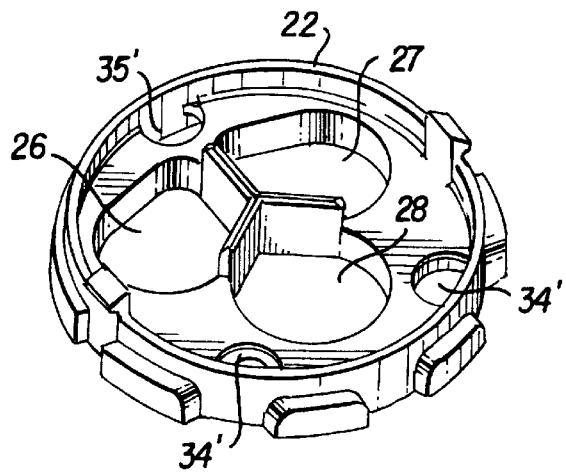
FIG. 7 shows only the bottom wall as seen from the inside of the mixing valve.
Figure 7A:
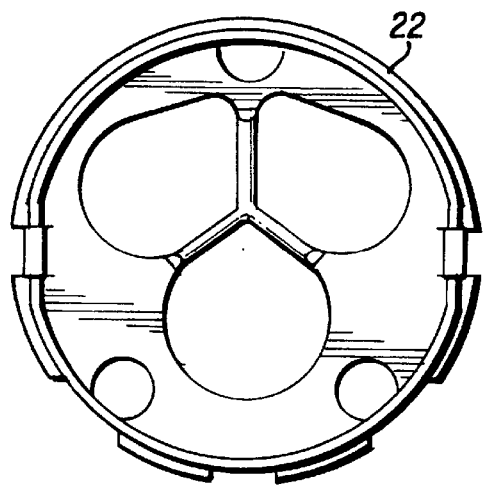
FIGS. 7a, 7b and 7c show respectively plan views of the inside, side and outside of the bottom wall of FIG. 7.
Figure 7B:
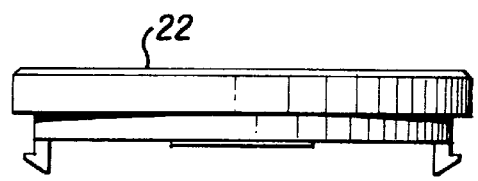
Figure 7C:
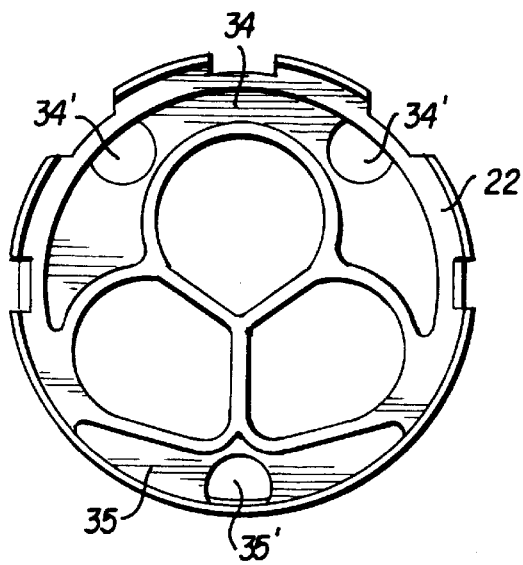

An adapter element 31 of a greater size can also be applied to the closure element 22 of the mixing valve; this greater adapter element 31 can assist in lengthening the height of the cartridge body 20 or can. or also can, make suitable the outer diameter of the cartridge body 20 for a greater diameter (see FIG. 4).

The greater adapter element 31 contains holes 31a, 31b, 31c coinciding with the holes 26, 27, 28 in the closure element 22 and surrounded by packings, which are not shown here.

Figure 10:
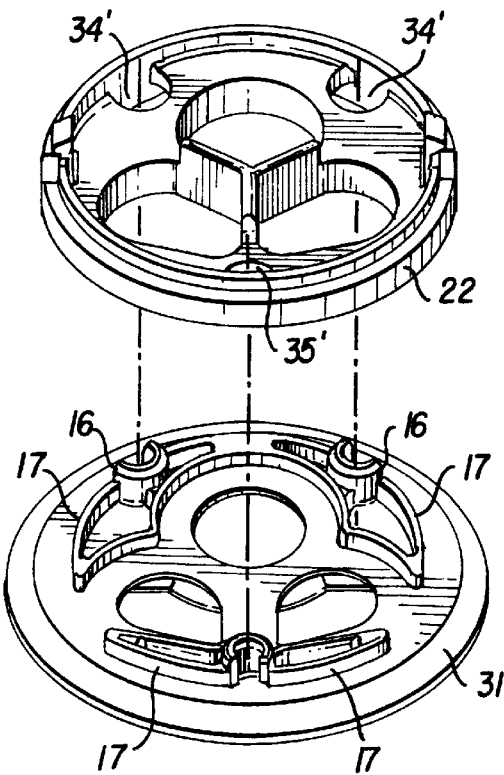
FIG. 10 is a three-dimensional view of the closure element of FIG. 2 and the adapter element of FIG. 4 in line for coupling.
Figure 9:
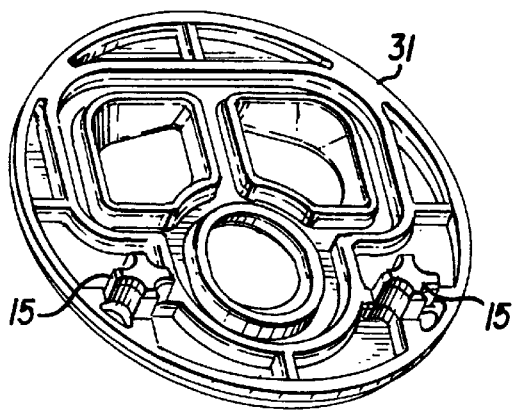
FIG. 9 is a three-dimensional view of the adapter element of FIG. 4 from the outside.
Figure 9A:
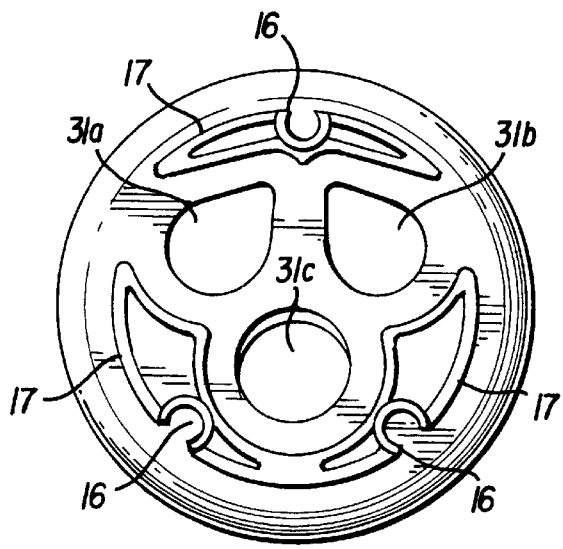
FIGS. 9a, 9b and 9c show respectively plan views of the inside, side and outside of the adapter element of FIG. 9.
Figure 9B:
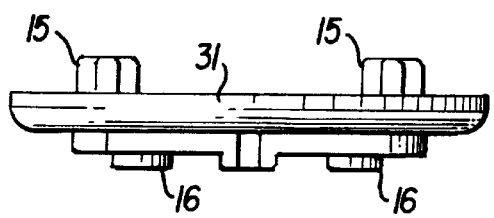
Figure 9C:
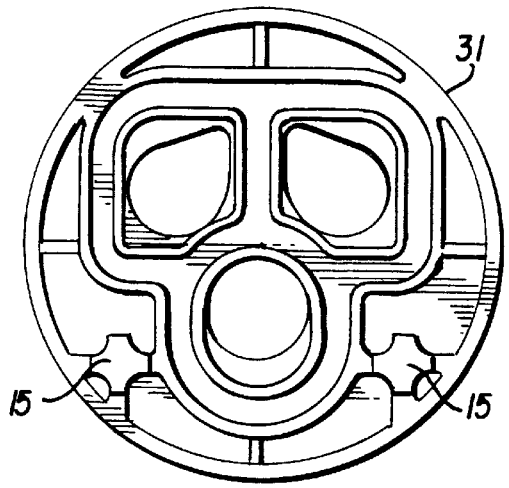

In this case, the greater adapter element 31 (see FIG. 4) includes in one face some walls 17 and pins 16 intended for insertion respectively in the connecting hollow 34 and positioner hollow 35 and in the recesses 34', 35' of the closure element 22, as shown in FIGS. 9a, 9b and 10.

The greater adapter element 31 thus remains constrained in the cartridge body 20 to perform the function provided therefor.

According to a variant, the greater adapter element 31a is substantially flat on its upper side and requires the basic adapter element 30 for its connection to the cartridge body 20.

The greater adapter element 31 according to the invention on its surface opposite to that of its connection to the cartridge body 20, namely on its lower surface, includes two attachment feet 15 so as to define together with the cartridge body 20 a cartridge complete in itself and ready for positioning in the tap body.

According to a variant a connecting hollow 34 is included in that lower surface and is suitable to lodge the basic adapter element 30.

To the closure element 22 of the mixing valve in the system according to the invention there can be applied also the first distributor element 32 or the second distributor element 33, these distributor elements differing from each other essentially in their diameter; the first distributor element 32 has a diameter equal to that of the cartridge body 20, whereas the second distributor element 33 has a greater diameter; both distributor elements 32, 33 include a peripheral groove to lodge a packing.

The first and second distributor elements 32, 33 act as a mixing chamber and are used in valves which do not include this function.

The first distributor element 32 contains passages 32a, 32b, 32c coinciding with holes 26, 27, 28 contained in the closure element 22, all these passages or some of them being surrounded by packings, which are not shown here.

The first distributor element 32 includes on its upper surface some walls 17 and pins 16 intended for insertion respectively in the connecting hollow 34 and positioner hollow 35 and in the recesses 34', 35' of the closure element 22 or greater adapter element 31.

The first distributor element 32 contains also, on its surface opposite to that connected to the cartridge body 20, namely on its lower surface, positioning feet 15 for the correct arrangement of the mixing valve, complete with the first distributor element 32, in the body of a tap.

The second distributor element 33 too contains passages 33a, 33b, 33c coinciding with the holes 26, 27, 28 contained in the closure element 22 of the mixing valve, all or some of these passages being surrounded by packings, which are not shown here.

The second distributor element 33 too has walls 17 and pins 16 on one of its surfaces, namely its upper surface.

The second distributor element 33 has on its opposite surface positioning feet 15 for the correct arrangement of the mixing valve, complete with that second distributor element 33, in the body of a tap.

FIG. 14 shows how the system embodied according to the invention is very versatile and provides great advantages for everybody.

FIG. 14 shows some possible applications so that the basic adapter element 30 and/or the greater adapter element 31 can in themselves complete the cartridge body 20 or can act as means to connect the cartridge body 20 to auxiliary elements such as distributor elements 32, 33, back-to-back means 19, pressure regulators 36, temperature regulators, vacuum breakers 18, etc.

It is possible to see, in particular, how the cartridge body 20 can be coupled to elements having specialised functions 36a, 18a, 19a and personalised with walls 17 and pins 16. or with analogous standardised elements 36b, 18b and 19b by using the adapter elements 30, 31.

Moreover, while the basic adapter element 30 makes possible the coupling of elements 36b, 18b and 19b of a smaller size, the use of the greater adapter element 31 makes possible the coupling of elements 136b, 118b and 119b of a greater size.

The greater adapter element 31 can be personalised with walls 17 or pins 16 or can be standardised 31a and. can cooperate in turn with a basic adapter element 30.

The first 32 and second 33 distributor elements too can in turn act for the connection of elements having specialised functions 36b, 18b and 19b of a standardised type.

According to a further variant, which is not shown here, the first 32 and second 33 distributor elements too may need the basic adapter element 30 or greater adapter element 31 for their coupling to the cartridge body 20.

It is therefore clear that the body of the mixing valve on each occasion can be equipped and therefore personalised with one or more auxiliary elements which characterise that body and adapt it to a specific installation requirement.

By starting with a basic valve and by having available only auxiliary elements complete in themselves it is possible to equip mixing valves with functions for particular purposes suitable for the desired conditions of use.

We claim:

1. A multipurpose system for cartridge valves to mix hot and cold water which comprises: a cartridge body (20) including an element (21) for controlling flow of the hot and cold water, and a plurality of auxiliary elements selected from the group consisting of adapters, distributors, and elements having specialist functions, and a closure element (22) for attaching to the element (21) for controlling flow to form a completed cartridge body, the closure element having an outer surface defining at least one connecting hollow (34) extending circumferentially, at least one said auxiliary element including a portion for mating with the connecting hollow (34).

2. A multipurpose system as in claim 1, wherein the completed cartridge body (20) has geometric dimensions of a smaller standardized cartridge.

3. A multipurpose system as in claim 1, wherein the completed cartridge body has a diameter of 35 mm.

4. A multipurpose system as in claim 1, wherein at least one auxiliary element is a basic adapter element (30) conformed to mate with the connecting hollow (34) and including attachment feet (15), the basic adapter element (30) in an installed position being contained in the connecting hollow (34).

5. A multipurpose system as in claim 1, wherein at least one of said adapters is a basic adapter element (30) comprising attachment feet and in an installed position lies substantially at the level of a lower edge of the closure element (22) of the cartridge body (20), the attachment feet (15) alone extending below the lower edge of the closure element (22).

6. A multipurpose system as in claim 1, wherein at least one of the auxiliary elements is a greater adapter element (31) of larger diameter than said completed cartridge body with a supporting base and attachment feet (15).

7. A multipurpose system as in claim 1, wherein the auxiliary element is at least one distributor element (32, 33) with relative attachment feet (15).

8. A multipurpose system as in claim 1, wherein the auxiliary element is at least one element have specialist functions selected from the group consisting of a back-to-back means (19), a pressure regulator (36), a temperature regulator, a vacuum breaker (18) or another means equipped on its lower side with optional attachment feed (15).

9. A multipurpose system as in claim 4, wherein any of the auxiliary elements can be applied to the cartridge body (20) with the basic adapter element (30) fitted to the cartridge body (20).

10. A multipurpose system as in claim 6, wherein any of the auxiliary elements can be applied to the cartridge body (20) with the greater adapter element (31) fitted to the cartridge body (20).

11. A multipurpose system as in claim 1, wherein a bottom of the closure element (22) of the cartridge body (20) contains a positioner hollow (35).

12. A multipurpose system as in claim 11, wherein at least one auxiliary element has a form mating with the positioner hollow (35).

13. A multipurpose system as in claim 1, wherein the connecting hollow (34) contains at least one reference recess (34').

14. A multipurpose system as in claim 11, wherein the positioner hollow (35) contains at least one reference recess (35').

15. A multipurpose system as in claim 13, wherein the auxiliary element which has a form mating with the connecting hollow (34) includes pins (16) mating with the reference recess (34').

16. A multipurpose system as in claim 14, wherein the auxiliary element which has a form mating with the positioner hollow (35) includes pins (16) mating with the reference recess (35').

17. A multipurpose system as in claim 1, wherein the element for controlling flow of the hot and cold water includes at least one bell-shaped element (21) closed by the closure element, wherein the closure element comprises a bottom wall (22) containing at least two inlets (26, 27) for hot and cold water respectively and an outlet (28) for the water to be used, wherein said connecting hollow (34) extends circumferentially at least partially around said inlets.

18. A multipurpose system as in claim 5, wherein the basic adapter element (30) comprises at least one plate for coupling to the closure element (22) of the cartridge body (20), wherein the plate comprises an upper surface and a lower surface, attachment feed (15) in the plate lower surface and optional coupling pins (16) in the plate upper surface.

19. A multipurpose system as in claim 6, wherein the greater adapter element (31) comprises a substantially circular plate for coupling to the closure element (22) of the cartridge body (20), wherein the plate comprises an upper surface and a lower surface, at least coupling pins (16) and walls (17) in the plate upper surface and attachment feet (15) in the plate lower surface.

20. A multipurpose system as in claim 19, wherein the lower surface of the greater adapter element (31) includes a connecting hollow (34) for accepting a basic adapter element (30) conformed to mate with the connecting hollow (34) and including attachment feet (15), the basic adapter element (30) in an installed position being contained in the connecting hollow.

21. A multipurpose system as in claim 1, wherein at least one of the auxiliary elements is a first distributor element (32) which has an upper surface, a lower surface, and a diameter substantially equal to that of the cartridge body (20) and includes coupling pins (16) and walls (17) in the first distributor element upper surface and attachment feet (15) in the first distributor element lower surface.

22. A multipurpose system as in claim 1, wherein at least one of the auxiliary elements is a second distributor element (33) which has an upper surface and a lower surface, and a diameter greater than that of the cartridge body (20) and includes coupling pins (16) and walls (17) in the second distributor element upper surface and attachment feet (15) in the second distributor element lower surface.

23. A multipurpose system as in claim 1, wherein the at least one auxiliary element is selected from the group consisting of a basic adapter element (30), an adapter element (31) of greater diameter than said cartridge body, a distributor element (33), a back-to-back means (19), a pressure regulator (36), a vacuum breaker (18), and a thermostat regulator.

24. A multipurpose system for cartridge valves to mix hot and cold water comprising a cartridge body (20), the cartridge body (20) comprising a cartridge body flow control element for controlling flow of hot water and cold water, a closure element (22), having an outer surface defining at least one connecting hollow (34) extending circumferentially, said closure element attached to said cartridge body flow control element to form a completed cartridge body, and at least one adapter element including a portion mating with said connecting hollow (34), wherein said adapter element mating with said connecting hollow defines attachment feet for attaching an optional specialized function element.

* * * * *